United States Patent
Titcomb et al.

(10) Patent No.: US 11,572,701 B2
(45) Date of Patent: *Feb. 7, 2023

(54) LOOP TIE FOR CONCRETE FORMING PANEL SYSTEMS

(71) Applicant: Titcomb Brothers Manufacturing, Inc., Westport, MA (US)

(72) Inventors: Paul S. Titcomb, Marion, MA (US); Ted Titcomb, East Sandwich, MA (US)

(73) Assignee: Titcomb Brothers Manufacturing, Inc., Westport, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/164,312

(22) Filed: Feb. 1, 2021

(65) Prior Publication Data

US 2021/0156158 A1     May 27, 2021

Related U.S. Application Data

(63) Continuation of application No. 16/252,281, filed on Jan. 18, 2019, now Pat. No. 10,907,365.
(Continued)

(51) Int. Cl.
    *E04G 17/07*     (2006.01)
    *E04G 17/06*     (2006.01)
    (Continued)

(52) U.S. Cl.
    CPC .......... *E04G 17/0721* (2013.01); *E04G 17/06* (2013.01); *B29C 53/564* (2013.01); *B29C 70/86* (2013.01)

(58) Field of Classification Search
CPC . E04G 17/0721; E04G 17/06; E04G 17/0742; E04G 17/0758; B29C 70/86; B29C 53/564
See application file for complete search history.

(56) References Cited

U.S. PATENT DOCUMENTS

| 371,665 A | 10/1887 | Brinkerhoff |
| 1,020,916 A | 3/1912 | Lanier |

(Continued)

FOREIGN PATENT DOCUMENTS

| DE | 102010013960 A1 | 10/2011 |
| EP | 0278803 A1 | 8/1988 |

(Continued)

OTHER PUBLICATIONS

International Search Report and Written Opinion, PCT/US2019/014286, dated Jul. 30, 2019, 8 pages.

(Continued)

*Primary Examiner* — Michael Safavi
(74) *Attorney, Agent, or Firm* — Nelson Mullins Riley & Scarborough LLP; Anthony A Laurentano

(57) ABSTRACT

A tie rod suitable for use with known concrete forming systems is constructed from a non-metal fiber, such as fiberglass, that is wound about a pair of opposed thimble elements. The resultant tie rod is as strong as a metal tie rod without the drawbacks of conventional metal tie rods. Each of the thimble elements has a main body having a channel formed in an outer surface of the main body, and the fiberglass fiber is disposed within the channel when wound thereabout.

18 Claims, 6 Drawing Sheets

Related U.S. Application Data

(60) Provisional application No. 62/619,545, filed on Jan. 19, 2018.

(51) Int. Cl.
  *B29C 70/86* (2006.01)
  *B29C 53/56* (2006.01)

(56) References Cited

U.S. PATENT DOCUMENTS

| | | |
|---|---|---|
| 1,257,827 A | 2/1918 | Emmons |
| 1,311,036 A | 7/1919 | Birch |
| 1,429,412 A | 9/1922 | Davidson |
| 1,518,955 A | 12/1924 | Backlund |
| 1,540,570 A | 6/1925 | Lud |
| 1,552,334 A | 9/1925 | Mosher |
| 1,577,343 A | 3/1926 | Miller |
| 1,594,973 A | 8/1926 | Moser |
| 1,615,338 A | 1/1927 | Moser |
| 1,648,995 A | 11/1927 | Phillips |
| 1,664,152 A | 3/1928 | Beghetti |
| 1,684,136 A | 9/1928 | Lynch |
| 1,925,221 A | 9/1933 | Wotnoske |
| 1,931,834 A | 10/1933 | Wotnoske |
| 1,987,076 A | 1/1935 | Oscar |
| 2,003,225 A | 5/1935 | Vrooman |
| 2,614,058 A * | 10/1952 | Francis .................. B29C 70/326 156/171 |
| 2,732,606 A | 1/1956 | Wheeler |
| 2,959,835 A | 11/1960 | Harris |
| 2,977,406 A * | 3/1961 | Scott ....................... H01B 17/12 174/177 |
| 3,010,494 A | 11/1961 | Horace |
| 3,111,569 A * | 11/1963 | Rubenstein ......... B28B 23/0006 52/223.14 |
| 3,222,858 A * | 12/1965 | Gilmore ................... D07B 1/18 57/201 |
| 3,301,931 A | 1/1967 | Morin |
| 3,362,252 A * | 1/1968 | Ditlinger ................ F16C 7/026 74/579 R |
| 3,370,483 A * | 2/1968 | Ditlinger ............... B64C 27/327 74/579 R |
| 3,411,742 A | 11/1968 | McCardle |
| 3,422,586 A * | 1/1969 | Parma ..................... E04G 21/12 52/223.14 |
| 3,457,962 A * | 7/1969 | Shobert .................... D04C 1/02 138/144 |
| 3,460,628 A * | 8/1969 | Tankersley .............. F16C 7/026 416/213 R |
| 3,513,609 A * | 5/1970 | Lang ......................... E04C 5/08 52/223.6 |
| 3,571,492 A * | 3/1971 | Clark ....................... H01B 17/12 174/178 |
| 3,601,356 A | 8/1971 | Yurick |
| 3,628,762 A | 12/1971 | Williams et al. |
| 3,668,740 A * | 6/1972 | Pearson ................ B29C 70/347 24/16 PB |
| 3,692,361 A * | 9/1972 | Ivarsson ................ B60R 22/22 297/482 |
| 3,782,220 A * | 1/1974 | Ditlinger ................ F16C 7/026 74/579 R |
| 3,785,610 A | 1/1974 | Dagiel |
| 3,795,380 A | 3/1974 | Turner |
| 3,917,216 A | 11/1975 | Plough |
| 3,923,278 A | 12/1975 | Marcil |
| 3,970,495 A * | 7/1976 | Ashton ................... B29C 33/52 156/162 |
| 3,978,626 A | 9/1976 | Weinar |
| 4,098,480 A | 7/1978 | Neumann |
| 4,103,854 A | 8/1978 | Pliml et al. |
| 4,119,344 A * | 10/1978 | Kondo .................... B60R 22/22 24/265 EE |
| 4,183,261 A * | 1/1980 | Eiselbrecher ......... B29C 53/564 74/579 R |
| 4,205,815 A | 6/1980 | Sauer et al. |
| 4,353,267 A * | 10/1982 | Robert .................. B29C 53/564 74/579 R |
| 4,367,819 A | 1/1983 | Lewis |
| 4,545,163 A | 10/1985 | Asselin et al. |
| 4,569,190 A * | 2/1986 | Gilmore .................. B60R 22/22 297/468 |
| 4,832,298 A | 5/1989 | Metcalf |
| 4,992,313 A * | 2/1991 | Shobert .................. B29C 53/582 428/36.1 |
| 5,154,388 A | 10/1992 | Magaro |
| 5,181,683 A | 1/1993 | Smith |
| 5,209,039 A | 5/1993 | Boeshart |
| 5,215,616 A * | 6/1993 | Fillar ..................... B65G 17/38 156/169 |
| 5,374,780 A * | 12/1994 | Pazdirek ................ B29C 70/347 174/137 A |
| 5,406,033 A * | 4/1995 | Pazdirek ................ B29C 70/347 174/167 |
| 5,768,847 A * | 6/1998 | Policelli ................... B29C 53/66 156/172 |
| 5,899,035 A | 5/1999 | Waalkes et al. |
| 5,924,262 A * | 7/1999 | Fawley ...................... B32B 5/28 156/71 |
| 6,209,279 B1 * | 4/2001 | Meier ....................... E04B 1/41 52/223.14 |
| 6,315,489 B1 | 11/2001 | Watanabe |
| 6,324,940 B1 * | 12/2001 | Pazdirek ................ B29C 53/585 174/47 |
| 7,014,155 B1 | 3/2006 | Schnabel et al. |
| 7,056,463 B2 * | 6/2006 | Ohta ..................... B28B 23/043 156/162 |
| 7,201,355 B1 | 4/2007 | Zien et al. |
| 7,497,344 B2 | 3/2009 | Chen |
| 8,281,537 B2 | 10/2012 | O'Shea et al. |
| 8,667,754 B2 * | 3/2014 | Schalla .................. B29C 70/222 52/362 |
| 8,679,275 B2 * | 3/2014 | Schalla ...................... F16C 7/02 156/169 |
| 8,777,162 B2 * | 7/2014 | Benthien ................. B64C 1/064 244/131 |
| 9,259,878 B2 * | 2/2016 | Valembois ............ B29C 53/564 |
| 9,523,178 B2 * | 12/2016 | Ferraiolo .................. E02D 5/80 |
| 10,493,703 B2 * | 12/2019 | Yasui ..................... B64C 13/30 |
| 10,907,365 B2 | 2/2021 | Titcomb et al. |
| 2002/0047073 A1 | 4/2002 | Deciry et al. |
| 2003/0197102 A1 | 10/2003 | Lin |
| 2005/0056749 A1 | 3/2005 | Simard |
| 2005/0230577 A1 | 10/2005 | Chen |
| 2006/0019759 A1 | 1/2006 | Shiao et al. |
| 2012/0211609 A1 | 8/2012 | Mandic |
| 2015/0136924 A1 | 5/2015 | Lachance |
| 2016/0089820 A1 * | 3/2016 | Schinkinger .......... B29C 70/521 264/172.11 |
| 2019/0226513 A1 | 7/2019 | Felix et al. |

FOREIGN PATENT DOCUMENTS

| | | |
|---|---|---|
| EP | 0595309 A2 | 5/1994 |
| FR | 2544775 A2 | 10/1984 |
| NL | 9101666 A | 5/1993 |
| WO | 2016189182 A1 | 12/2016 |

OTHER PUBLICATIONS

Department of Electric Power, Shandong Institute of Technology, "Construction of 35-110 kV overhead transmission line," Dec. 31, 1976, p. 155, English abstract not available cited in corresponding Chinese Office Action, CN Application No. 2019800092184, dated Jul. 21, 2021.

Zhao, Yuhan, Shanghai Jiaotong University Press, "Building material," Aug. 31, 2014, p. 217 English abstract of the article not

(56) References Cited

OTHER PUBLICATIONS available, cited in corresponding Chinese Office Action, CN Application No. 2019800092184, dated Jul. 21, 2021.

* cited by examiner

LOOP TIE FOR CONCRETE FORMING PANEL SYSTEMS

RELATED APPLICATIONS

This application is a continuation of U.S. patent application Ser. No. 16/252,281, entitled LOOP TIE FOR CONCRETE FORMING PANEL SYSTEMS, filed Jan. 18, 2019, which claims priority to U.S. provisional patent application No. 62/619,545, entitled LOOP TIE FOR CONCRETE FORMING PANEL SYSTEMS, filed on Jan. 19, 2018, the contents of each of which are herein incorporated by reference.

BACKGROUND OF THE INVENTION

Conventional concrete walls may be created by pouring concrete into a suitable concrete form. As is known in the art, concrete foundation walls are generally poured between two sets of concrete forms disposed in essentially parallel relationship and defining therebetween a channel having a dimension for the desired thickness of the concrete wall. Such opposed, spaced apart walls are generally held in a fixed relationship relative to each other against the immense weight of any poured concrete by tie-wires and turnbuckle assemblies having abutment surfaces against which a locking or latching arm on adjacent form sections abut. Once assembled into the shape of the wall, wet concrete is poured into the channel formed between the concrete forms and allowed to dry. The concrete forms typically comprise multiple form panels, which may for example be formed of wood, metal or any other suitable well known material. The height of the form panel may vary by application.

Multiple form panels may be placed side-by-side in order to construct a wall of a desired length. Because the wet poured concrete takes the shape of the forms in which it is placed, the finished concrete wall corresponds in configuration to the assembled form. Therefore, it is important to align precisely the panels composing the concrete form in order to ensure that the finished wall has the desired appearance and strength.

The concrete forming systems can also employ tie-rods that are disposed between aligned panels in order to keep the panels properly spaced apart and to ensure that the panels are coupled to each other in a secure manner. The tie rods extend through openings formed in the spaced apart form panels and hold the sections against relative movement toward each other. The tie-rods may extend outwardly of the sections by a selected amount as is known in the art. The portion of the tie-rods that extend beyond the panel forms typically include a flattened or coined section that is adapted to engage with the latch that is coupled to the panel bar. Once the concrete is poured between the panel forms and allowed to cure, the portion of the tie rods that extend beyond the concrete walls can be snapped off.

Conventional tie rods are typically formed of metal, such as steel. However, the prior art has also designed systems that employ fiberglass ties in the shape of linear rods. The fiberglass tie rods are typically formed of fiberglass fibers that are all essentially disposed parallel to each other and hence extend in a longitudinal direction. The rods can be coupled to the concrete forms according to known techniques. According to a first known system and method, the fiberglass tie rods can have a thread formed thereon so as to accept a corresponding fastening nut. A drawback of these types of rods is that it is expensive to grind the threads into the finished rod, and the fastening nuts can be difficult to attach at times.

According to another known system and method, the fiberglass rod can be secured to the form panels using complex and expensive fastening hardware. The hardware can include a bearing plate, a tensioning nut, and a barrel and jaw assembly that employs a wedge shaped gripper to grip the exposed end of the tie rod. A drawback of this type of hardware is that it is expensive, labor intensive, prone to rusting, and over time can be difficult to use. Further, the hardware when removed typically needs to be cleaned and maintained in order to remove excess concrete therefrom.

Another form of non-metallic tie used a fiberglass strip similar in form to conventional metal flat ties. However, a drawback of ties of this type are that they are significantly lower in strength relative to conventional metal ties, and leaves a larger exposed end in the face of the wall when the exposed portion of the tie is removed. Further, these types of ties have poor water sealing capabilities and make it difficult to user a water stopping element, such as round rubber washer.

SUMMARY OF THE INVENTION

The present invention is directed to a tie rod, such as a loop tie rod, suitable for use with known concrete forming systems. The tie rod is constructed from a non-metal fiber, such as fiberglass, that is wound about a pair of opposed thimble elements. The resultant tie rod is as strong as metal tie rod without the drawbacks of conventional metal tie rods. The tie rod of the present invention has selected advantages over conventional metal tie rods. For example, the fiberglass tie rod creates a thermal break between the end portions of the tie rod. Also, non-metal fiber, such as fiberglass, has thermal expansion characteristics that are more closely matched with concrete, such that the concrete bonds better to the tie rod of the present invention. This prevents or significantly reduces water pathways that may develop between opposite wall surfaces of the concrete wall.

The tie rod of the present invention is suitable for use with concrete forming systems and include first and second thimble elements, a continuous fiber wound between the first and second thimble elements to form the tie rod, wherein each of the thimble elements has a main body having a channel formed in an outer surface of the main body, and wherein the fiberglass fiber is disposed within the channel when wound thereabout. The fiber is wound about the thimble element a selected number of times ranging between about 8 times and about 35 times.

The channel in the thimble elements has a width of between about 0.175 inches and about 0.22 inches, and is preferably about 0.20 inches. The main body of the tie rod has a generally horse-shoe shape, which has ether an open or a closed end. The main body can also include an optional tab portion that extends outwardly therefrom from one end and one side surface of the thimble element. The tab portion is preferably located at a position opposite a closed end of the main body. The outer surface of the main body of the tie rod has the channel formed therein and includes an opposed inner surface. The inner surface can include an optional fin element.

The continuous fiber of the present invention can be formed of fiberglass, and can be optionally coated with a curing agent. The curing agent can comprise an epoxy resin material.

The present invention can also be directed to a method of forming a tie rod suitable for use with a concrete forming system. The method can include providing first and second thimble elements, wherein each of the thimble elements has a main body having a channel formed in an outer surface thereof, winding a continuous fiber between the first and second thimble elements such that the fiber is disposed within the channel of each thimble element to form an uncured tie rod, curing the uncured tie rod to form a cured tie rod, and placing the cured tie rod under tension for a selected period of time to form the tie rod.

The step of curing the uncured tie rod comprises heating the uncured tie rod for a selected period of time. The step of heating can further comprise heating the uncured tie rod for between about 1 and about 2 hours, and at a temperature of between about 250° F. and about 300° F.

The present invention can also include the step of optionally coating the fiber with a curing agent. Optionally, the fiber is pre-coated with a curing agent prior to winding the fiber about the first and second thimbles.

Those of ordinary skill in the art will recognize that the present invention contemplates and can include any combination of the foregoing features or elements.

BRIEF DESCRIPTION OF THE DRAWINGS

These and other features and advantages of the present invention will be more fully understood by reference to the following detailed description in conjunction with the attached drawings in which like reference numerals refer to like elements throughout the different views. The drawings illustrate principals of the invention and, although not to scale, show relative dimensions.

DETAILED DESCRIPTION OF THE INVENTION

Figure 1:
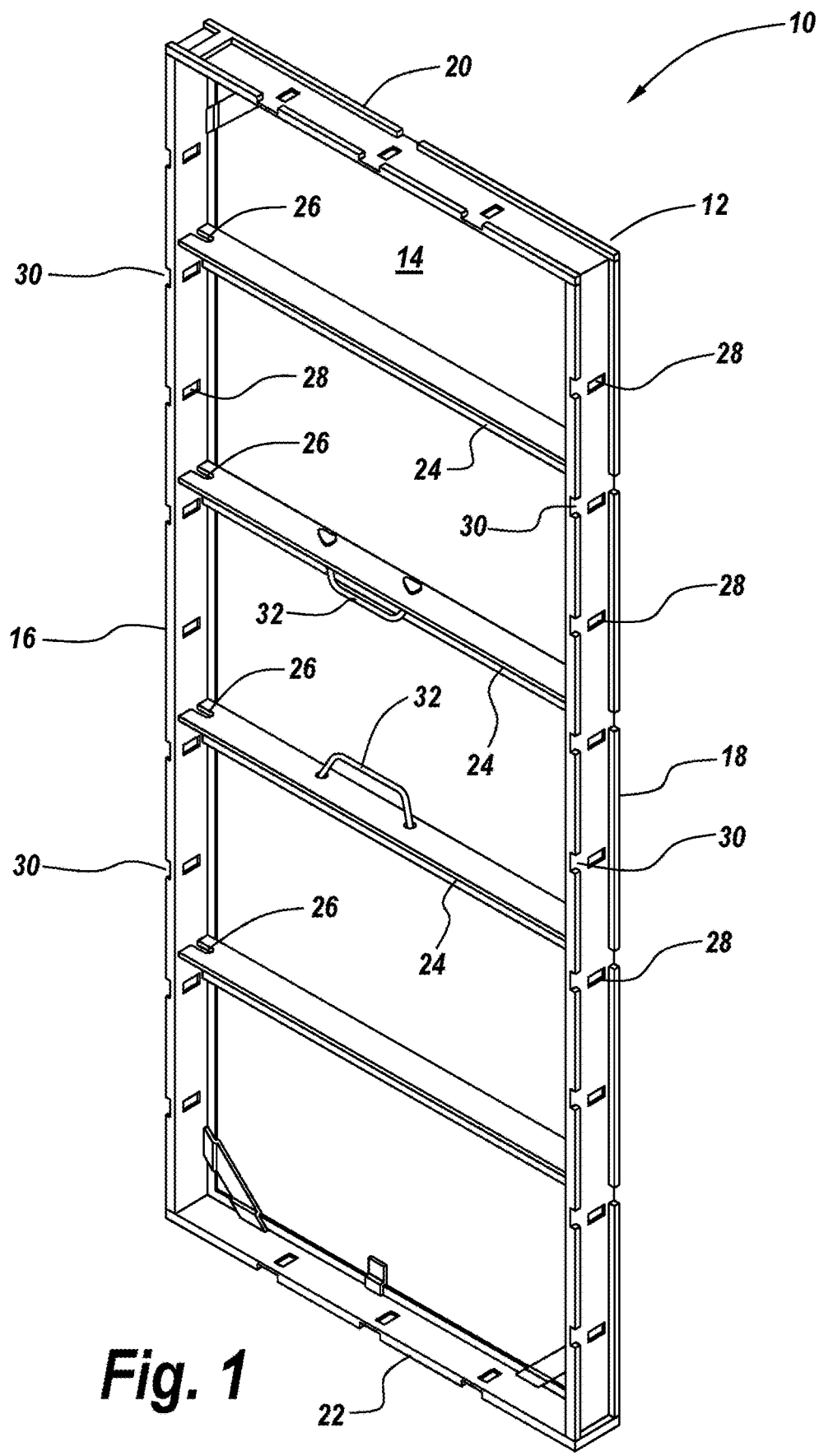
FIG. 1 is a perspective view of a metal, frame based concrete forming system suitable for employing the tie rod of the present invention.
Figure 2:
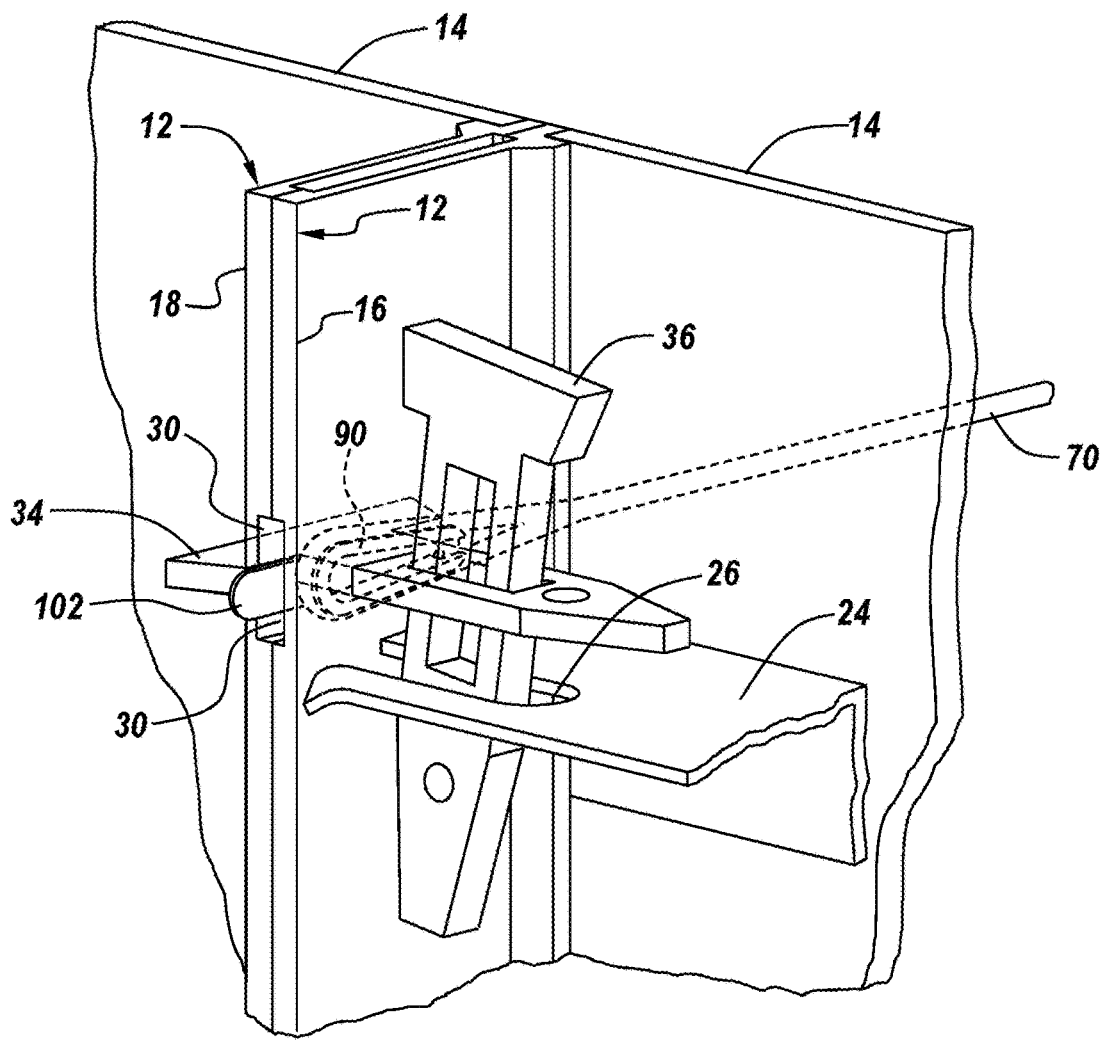
FIG. 2 is partial sectional view of adjacent concrete forming systems employing mounting hardware, such as wedge bolts, and the tie rod of the present invention.
Figure 3:
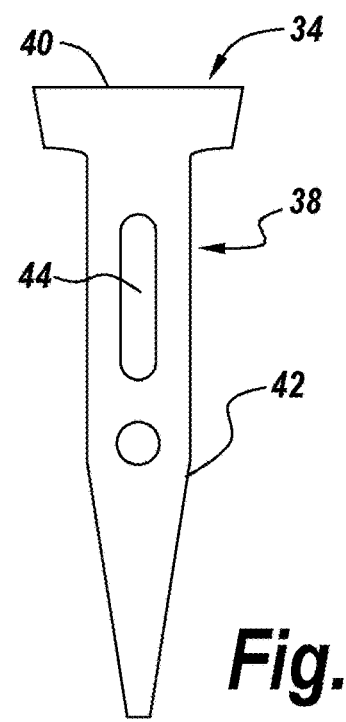
FIG. 3 is a perspective view of the wedge bolt of FIG. 2.

There exists in the art metal, frame-based, panel type concrete forming systems and associated hardware, such as fillers and wedge bolts, for forming concrete walls of any size and shape. An example of a commercially available metal concrete forming system is the Steel-Ply Concrete Forming System from Dayton Superior Corp. The illustrated metal concrete forming system 10 includes a steel frame 12 that can employ a metal or wood facing 14. As shown in FIGS. 1-3, the metal frame 12 has a pair of vertical side rails 16, 18 forming left and right side rails and a pair of horizontal side rails 20, 22 forming the top and bottom rails. Further, a plurality of horizontal cross-member or support rails 24 are formed between the two opposed side rails 16, 18 and help form supports for the frame 12. The cross members 24 also have a cross-member slot 26 formed therein adjacent to the side rails 16, 18. The facing material 14, such as plywood, is attached to one face side of the frame 12. The plywood 14 is typically used to form a smooth finish to the formed concrete wall. The vertical side rails 16, 18 both have side slots 28 formed therein intermittently throughout the length of the side rail. The side slots 28 are adapted to accommodate a securing bolt, such as a wedge bolt, as described further below. Further, the side rails 16, 18 include a plurality of dado slots 30 formed therein adjacent to the side slots 28. Further, certain cross-members 24 can include a handle 32 formed thereon to assist the user in lifting and manipulating the panel.

The metal form panels 12 can be placed adjacent to each other to form the rough outline of the concrete wall to be formed. As shown in FIGS. 2-3, the adjacent panels 12 can be coupled together and to tie rods or ties 70 disposed within the wall to be formed using a lock-bolt set comprising first and second wedge bolts 34, 36, as is known in the art. In the current embodiment and example, the metal framing system employs loop style tie rods or ties. The first and second wedge bolts can be identical if no filler parts are employed or can be differently configured if a filler part is employed, as is known. As shown, each of the wedge bolts 34, 36 has a main body 38 having a head portion 40 and a wedge shaped body 42 extending therefrom. The wedge shaped body 42 has a bolt slot 44 formed therein.

The dado slots 30, 30 formed in the side rails 18, 16 of adjacent panels form an enclosure that is adapted to accommodate the protruding end of an associated tie rod 70. The tie rod 70 is used to help strengthen the finished wall that is formed. In metal concrete forming systems, the tie rod can be either a loop tie or a flat tie. Conventional metal loop ties have a main body that has a loop formed at both ends. These types of ties can also be conventionally referred to as panel or S-ties. When positioned correctly between opposed forming panels, the loop ends of the tie are positioned between the dado slots 30 and is aligned with the side slots 28 formed in the side rails 16, 18. The first wedge bolt 34, such as a connecting wedge bolt, is slid into the side slot 28 formed in the side rail 16, 18 and through the loop end of the tie. As such, the tapered end of the first wedge bolt 34 and specifically the bolt slot 44 is exposed. The tapered end 42 of the second wedge bolt 36, such as a clamping wedge bolt, is disposed in the bolt slot 44 and also seats within the cross-member slot 26. The clamping bolt helps connect together the adjacent panels and also helps secure the tie rod.

The tie rod 70 is typically disposed between aligned panels in order to keep the panels properly spaced apart and to ensure that the panels are coupled to each other in a secure manner. The tie rod 70 extends through openings formed in the spaced apart form sections or panels and holds the sections against relative movement toward each other. The tie rods may extend outwardly of the concrete walls and if desired the form panels by a selected amount as is known in the art. Once the concrete is poured between the panel forms and allowed to cure, the portion of the tie rods that extend beyond the concrete walls can be removed.

A problem with conventional tie rods is that they can be relatively difficult to position relative to the metal form panels. Further, the portion of the tie rods that extends beyond the formed and cured concrete wall can be difficult to remove, or when snapped off, typically do not break off cleanly from the rest of the tie rod embedded in the wall. Further, in architectural environments where a clean and relatively unmarked wall is important, the use of conventional metal loop or flat ties presents a problem. Currently, the portion of the ties that extend beyond the wall are snapped off or otherwise removed. This removal process may serve to mar the formed concrete wall. Also, the portion of the tie that remains in the wall can be prone to rusting, and hence at a later time can mar the aesthetics of the finished wall. Further, the ties cannot be used in selected applications, such as sites that require non-magnetic features in the walls, such as medical buildings.

To address these and other issues of conventional metal loop ties, the tie rod 70 of the present invention can be formed of a material other than metal. According to one practice, the tie rod is non-metal, and can be made for example from fibers formed of fiberglass, carbon, and para-aramid synthetic fibers such as Kevlar. The material can be coated, if desired, with one or more other materials. For example, the fiber material can be pre-coated, coated as the fiber is wound about the thimble elements 90, or coated after the tie rod is formed using any suitable material. The coating material can be used to bind the fiber winds together or can be used as a curing or hardening agent. The tie rod 70 of the present invention is illustrated in FIGS. 4-9. The tie rod of illustrated therein is a loop style tie rod, although other forms and configurations can be employed consistent with the teachings of the present invention. The illustrated loop tie rod 70 of the present invention has a main body 72 with a central linear region 74 and has loops 76, 78 formed at opposed ends. The loops 76, 78 can be sized, if desired, to house a reinforcing element, such as thimble element 90. According to an alternate embodiment, the illustrated loop tie rod 70 does not include the thimble element 90. The loop tie rod 70 is preferably formed from a fiberglass material that can be, if desired, coated with a select material, such as a binding material. According to one embodiment, the fiberglass can be pre-coated or coated with any suitable curing or hardening material, such as with an epoxy resin material, such as that commercially available from TCR Composites, USA. The fiberglass is preferably a high strength glass fiber, although other strength types can be used. The fiberglass tie rod of the present invention has low thermal conductivity, and has a thermal expansion coefficient similar to concrete, thus creating a better bond between the tie and concrete, which serves to improve the overall water sealing capability of the tie. The fibers employed in the present invention, such as the fiberglass fibers, exhibit a tensile strength of between about 300K PSI and about 530K PSI. The finished and cured tie rod 70 preferably exhibits a tensile strength of around 6000 PSI. A key feature of the present invention is that the strength of the resultant fiberglass tie rod 70, in use, is able to significantly match the strength of conventional metal loop ties.

Figure 9:
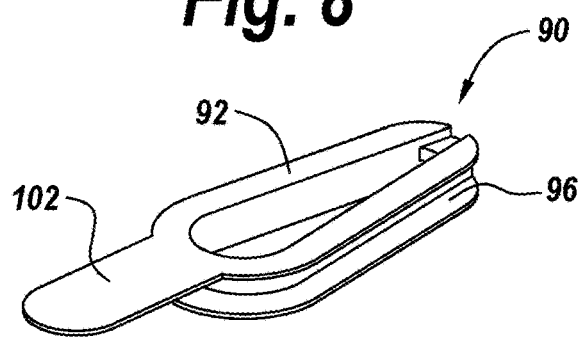
FIG. 9 is a perspective view of the thimble portion of the tie rod of the present invention illustrating the tab portion of the thimble.

The illustrated thimble element 90 has a main body 92 that is shaped in a manner similar to a horse-shoe shape that can have an open or closed end, and preferably has a closed end. The outer circumferential edge or surface 94 of the main body has a channel 96 formed therein. The channel preferably has a thickness or width of between about 0.175 inches and about 0.22 inches, and preferably has a width of about 0.20 inches. The inner surface 98 of the main body has an optional raised edge-like protrusion 100 that forms a fin feature or element. In an alternate embodiment, as shown in FIG. 9, the thimble 90 can include a tab-like protrusion 102 that extends outwardly from the outer surface 94 of the main body 92. According to another practice, the floor of the channel 96 can have a low friction coating or material applied thereto. For example, the channel can be coated with a polytetrafluoroethylene (PTFE) material or with a polytetrafluoroethylene (PTFE) tape so as to reduce the frictional forces of the thimble 90. Further, the coating also serves to increase the overall strength of the tie rod 70. Alternatively, the thimble main body can be coated with any suitable material, such as with a tin-based material or PTFE. The thimble element 90 of the present invention can be made from any suitable material, including from metal materials, such as from zinc-based alloys (e.g., Zamak 3), steel, aluminum, magnesium alloy, carbon fiber, polytetrafluoroethylene (PTFE), or plastic, or from combinations of these materials.

Figure 4:
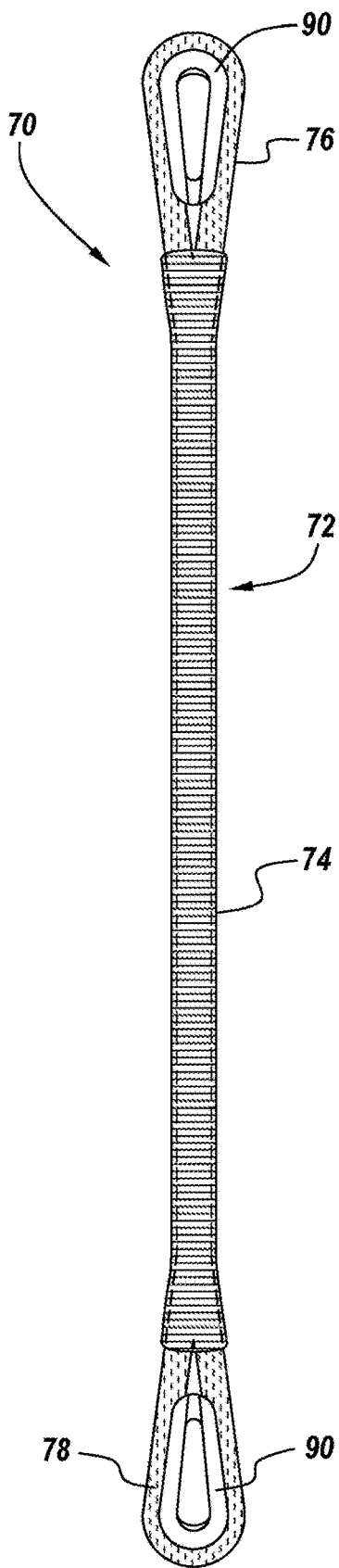
FIG. 4 is a perspective view of the tie rod of the present invention.
Figure 5:
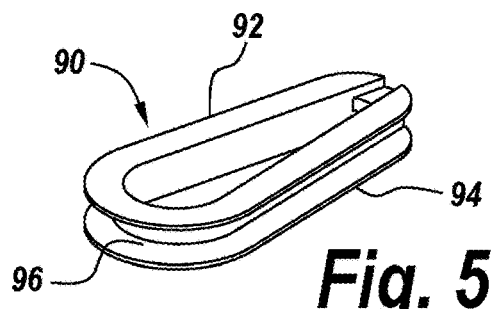
FIGS. 5 and 6 are perspective views of the thimble portion of the tie rod of the present invention.
Figure 6:
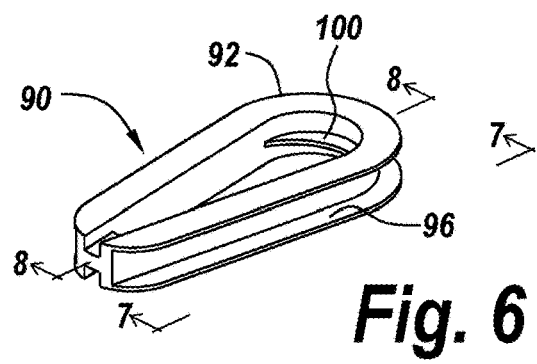
Figure 7:
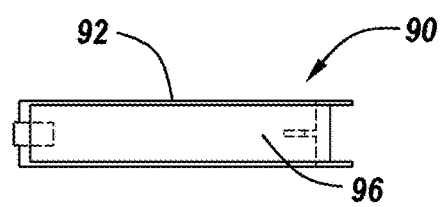
FIG. 7 is a cross-sectional view of the thimble portion of the tie rod of the present invention along line 7-7 of FIG. 6.
Figure 8:
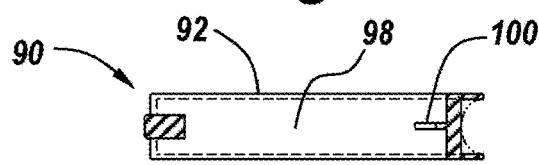
FIG. 8 is a cross-sectional view of the thimble portion of the tie rod of the present invention along line 8-8 of FIG. 6.
Figure 10:
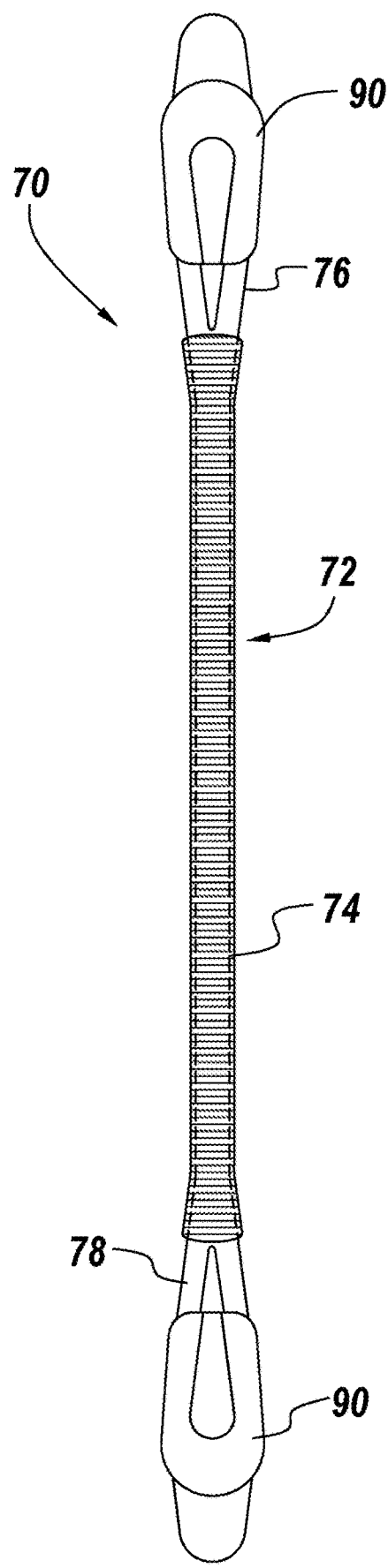
FIG. 10 is a perspective view of the tie rod of the present invention.
Figure 11:
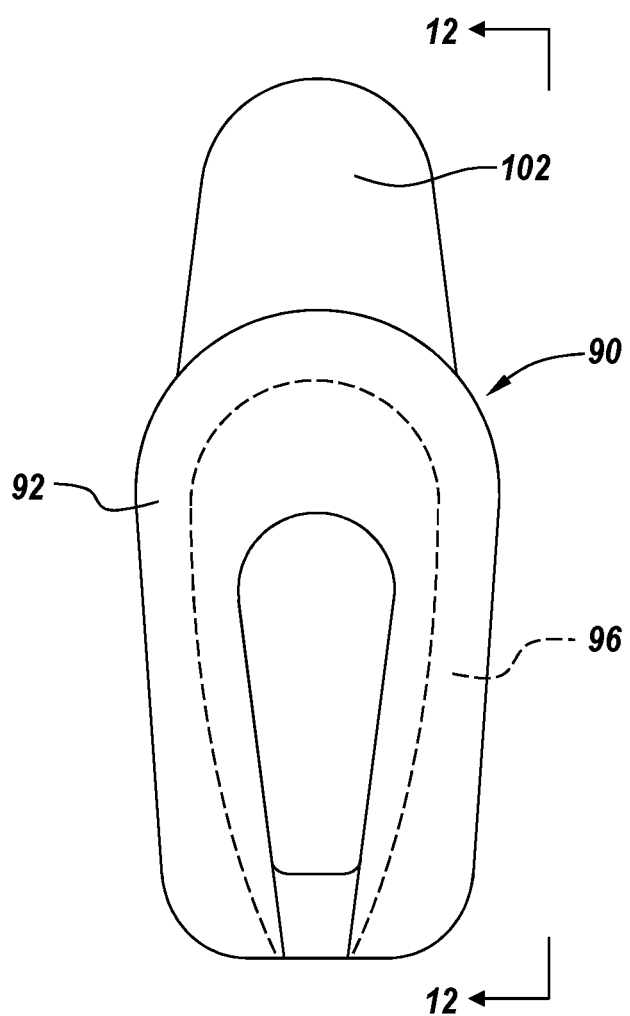
FIG. 11 is a front view of another embodiment of the thimble element of the present invention.
Figure 12:
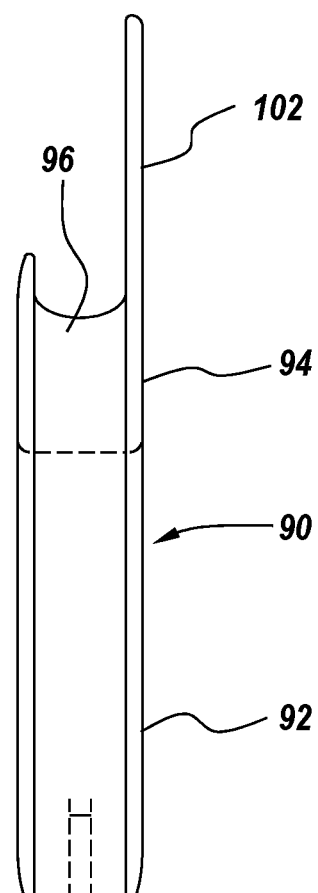
FIG. 12 is a side view of the thimble element of FIG. 11.
Figure 13A:
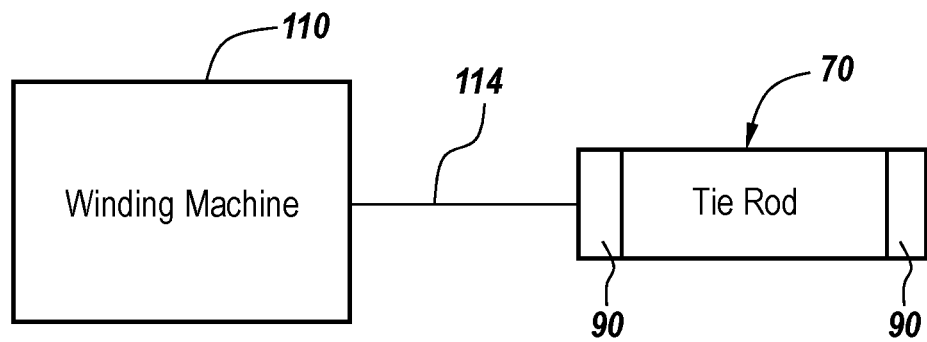
FIG. 13A is a schematic block diagram illustrating the winding machine employed for winding the fiber to create the tie rod of the present invention.
Figure 13B:
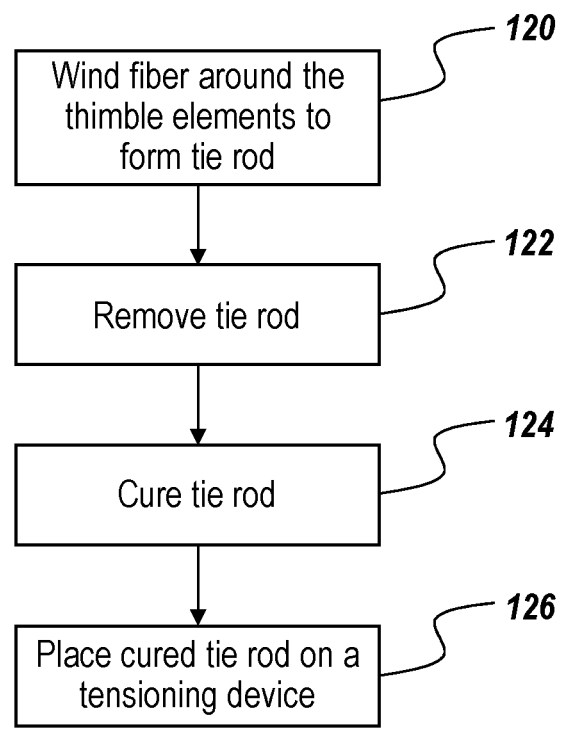
FIG. 13B is a flowchart diagram illustrating the steps for forming the tie rod of the present invention.

The illustrated loop tie rod 70 of the present invention can be formed by winding the fiber 114 (e.g., fiberglass material) using any suitable fiber or filament winding machine 110 about the opposed thimble elements 90. For example, as shown in FIGS. 10A and 10B, the loop tie rod 70 has associated therewith the thimble elements 90, 90. The illustrated fiber 114 can be wound about the thimble elements 90, 90 by the winding machine according to known techniques, step 120. For example, the tie rod 70 can be placed on or coupled to a rotating and/or translational mandrel or support (not shown) and the fiber can be wound, under tension, between the opposed thimble elements. Alternatively, the fiber winding machine 110 can be rotated about the tie rod. The loop tie rod 70 thus includes one or more continuous glass fibers that are wound into the desired shape of the loop tie. When the continuous fiber is wound about the thimbles 90, 90, the fibers are preferably maintained under tension, such as between about 2 lbs and about 10 lbs pressure, and the overwrap tension on the fiber when wound to create the overwrap is between about 5 lbs pressure and about 20 lbs pressure. The fiber is wound about the thimble elements a selected number of times ranging between about 8 times and about 35 times, depending upon the size and yield of the fiber. The fibers are wound between the thimbles until the channel 96 is filled with the fibers. Upon completion, the tie rod can be completed by optionally continuing to wind the fiber to create an optional overwrap in the central region 74 of the tie. As is shown, the number of wraps of the fiber between the thimble elements 90, 90 can be specified such that the fiber fills the channel 96 of the thimble element without extending beyond the confines of the channel. Optionally, the fiber can be wound further until the fiber extends past the confines of the channel 96, as shown in FIG. 4.

The completed loop tie 70 is then removed from the supporting structure, step 122, and then cured by heating by placing the loop tie in any suitable heating device for a selected duration of time and at a selected temperature, step 124. For example, according to one embodiment, the loop tie is cured by being placed in a heating oven for about 1 to about 2 hours, at a temperature of about 250° F. to about 300° F., based on the type of material used. Those of ordinary skill will readily recognize that the time and temperature can vary as a function of the material type used to form the tie. Those of ordinary skill will also recognize that UV-based epoxy resins can also be used, and hence can be cured using UV radiation rather than heat. Once completed, the finished tie can be placed on a tensioning device or frame (not shown) which keeps the cured loop tie under tension so as to align and equalize the fibers for any suitable amount of time, step 126.

The illustrated tab portion 102 of the thimble 90 can help guide the tie rod 70 through the dado slots 30 formed in the form panels 12 when the panels are assembled. Further, the tab portion 102 can provide a visual indication or confirmation that a tie rod 70 is indeed in place when the panels are all assembled, since it projects outwardly beyond the panels on the outside of the wall. Without the tab portion, there is no quick and easy way to visually confirm that a tie rod was not missed when installing the panel forms. Those of ordinary skill will readily recognize that not all types of ties, including loop ties, are designed to provide an end portion that will readily pass through the panel forms and extend therebeyond to allow visual confirmation of placement. Thus, the tab extension 102 allows the fiberglass tie rod of the present invention to easily pass through the forms (e.g., the dado slots) and extend past the forms so as to easily viewable by the user.

Further, the optional ridge or fin element 100 formed along the inner surface 98 of the main body 92 is adapted to bear against the wedge bolt 34, 36 that engages it when assembled in the panel system. The fin element 100 is sized and shaped such that it can deform, that is, give way under load, in a predictable way and rate. In doing so, the fin element 100 allows the tie rod 70 to effectively lengthen to a limited extent, which aids in equalizing the load shared with neighboring tie rods, so that slight variations in length of the tie rods do not subject the shortest tie rod in a group to unwanted and undesirable stresses. Further, the ridge portion is a visual indicator and can act as forensic evidence of overloading of the tie rod ends of the tie in the event of a blowout of the wall when pouring. Similarly, the thimble element 90 can be free of the fin element 100 and the main body portion of the thimble element that contacts the wedge bolts or other panel elements can deform at the point of contact, which is usually where the inner portion of the thimble element contacts the wedge bolts in an axial direction. This deformation of the tie rod main body also serves to effectively lengthen the overall length of the tie rod to a limited extent. Further, the tie rod of the present invention can be configured to work with plywood form panel systems, such as Resi-Ply concrete forming systems, and aluminum form panel systems.

The foregoing description may provide illustration and description of various embodiments of the invention, but is not intended to be exhaustive or to limit the invention to the precise form disclosed. Modifications and variations of the tie rod of the present invention may be possible in light of the above teachings or may be acquired from practice of the invention. For example, while a series of acts has been described above, the order of the acts may be modified in other implementations consistent with the principles of the invention. Further, non-dependent acts may be performed in parallel.

In addition, one or more implementations consistent with principles of the invention may be implemented using one or more devices and/or configurations other than those illustrated in the Figures and described in the Specification without departing from the spirit of the invention. One or more devices and/or components may be added and/or removed from the implementations of the figures depending on specific deployments and/or applications. Also, one or more disclosed implementations may not be limited to a specific combination of hardware. Furthermore, certain portions of the invention may be implemented as logic that may perform one or more functions. This logic may include hardware, such as hardwired logic, an application-specific integrated circuit, a field programmable gate array, a microprocessor, software, or a combination of hardware and software.

No element, act, or instruction used in the description of the invention should be construed critical or essential to the invention unless explicitly described as such. Also, as used herein, the article "a" is intended to include one or more items. Where only one item is intended, the term "a single" or similar language is used. Further, the phrase "based on," as used herein is intended to mean "based, at least in part, on" unless explicitly stated otherwise. In addition, the term "user", as used herein, is intended to be broadly interpreted to include, for example, an electronic device (e.g., a workstation) or a user of an electronic device, unless otherwise stated.

Further, the invention can be employed using any combination of features or elements as described above, and are not limited to the current recited steps or features.

It is intended that the invention not be limited to the particular embodiments disclosed above, but that the invention will include any and all particular embodiments and equivalents falling within the scope of the following appended claims.

The invention claimed is:

1. A tie rod suitable for use with a concrete forming system, comprising
   first and second thimble elements,
   a continuous fiber wound between the first and second thimble elements to form the tie rod,
   wherein each of the thimble elements has a main body having a channel formed in an outer surface of the main body, and wherein the continuous fiber is disposed within the channel when wound thereabout,
   wherein the channel of each of said thimble elements has first and second opposed side walls and a bottom surface, and wherein the bottom surface has a curved shape, and
   wherein the main body has a tab portion that extends outwardly therefrom from one end of the thimble element.

2. The tie rod of claim 1, wherein the channel has a width of between about 0.175 inches and about 0.22 inches.

3. The tie rod of claim 2, wherein the channel has a width of about 0.20 inches.

4. The tie rod of claim 1, wherein the main body of the tie rod has a generally horse-shoe shape.

5. The tie rod of claim 4, wherein the main body has a closed end region.

6. The tie rod of claim 1, wherein the tab portion is located at a position opposite a closed end of the main body.

7. The tie rod of claim 1, wherein the fiber is wound about the thimble elements a selected number of times ranging between about 8 times and about 35 times.

8. The tie rod of claim 4, wherein the main body comprises the outer surface having the channel formed therein and an inner surface, further comprising a fin element formed on the inner surface.

9. The tie rod of claim 1, wherein the fiber is formed of fiberglass.

10. The tie rod of claim 9, wherein the fiberglass fiber is coated with a curing agent.

11. The tie rod of claim 10, wherein the curing agent comprises an epoxy resin material.

12. The tie rod of claim 1, wherein the concrete forming system comprises a plurality of steel frames having, in a first orientation, a pair of vertical side rails and a plurality of horizontal support rails, wherein each of the vertical side rails has a plurality of side slots and a plurality of dado slots formed therein, and wherein each of the horizontal support rails has a support rail slot formed therein adjacent to one or more of the vertical side rails.

13. The tie rod of claim 12, wherein each of the plurality of side slots and each of the support rail slots are sized and configured for seating a securing bolt.

14. The tie rod of claim 13, wherein the securing bolt is a wedge shaped bolt.

15. The tie rod of claim 12, wherein one or more of the dado slots of a first one of the plurality of frame members is in registration with one or more of the dado slots of a second one of the plurality of frame members to form an enclosure that is sized and configured for allowing passage of the thimble element and for seating a main body of the thimble element.

16. A concrete forming system, comprising a tie rod having first and second thimble elements, and a continuous fiber wound between the first and second thimble elements to form the tie rod, wherein each of the thimble elements has a main body having a channel formed in an outer surface of the main body, and wherein the continuous fiber is disposed within the channel when wound thereabout, and wherein the channel of each of said thimble elements has first and second opposed side walls and a bottom surface, and wherein the bottom surface has a curved shape, a plurality of steel frames having, in a first orientation, a pair of vertical side rails and a plurality of horizontal support rails, wherein each of the vertical side rails has a plurality of side slots and a plurality of dado slots formed therein, and wherein each of the horizontal support rails has a support rail slot formed therein adjacent to one or more of the vertical side rails.

17. The system of claim 16, wherein each of the plurality of side slots and each of the support rail slots are sized and configured for seating a securing bolt.

18. The system of claim 17, wherein the securing bolt is a wedge shaped bolt.

* * * * *